Figures 1, 2:
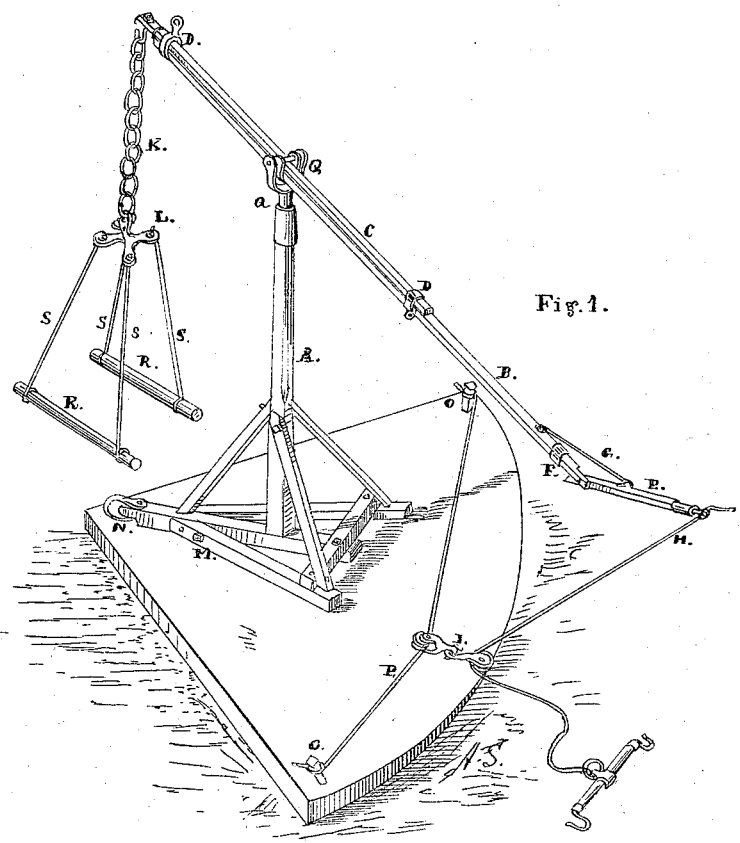

F. DONALD & G. S. NEWTON.

Derricks.

No. 135,785.  Patented Feb. 11, 1873.

Witnesses:
A. Schattenberg
E. J. Smith

Inventor:
Frank Donald
George S. Newton

AM. PHOTO-LITHOGRAPHIC CO. N.Y. (OSBORNE'S PROCESS)

UNITED STATES PATENT OFFICE.

FRANK DONALD AND GEORGE S. NEWTON, OF WAUPUN, WISCONSIN.

IMPROVEMENT IN DERRICKS.

Specification forming part of Letters Patent No. 135,785, dated February 11, 1873.

*To all whom it may concern:*

Be it known that we, FRANK DONALD and GEORGE S. NEWTON, of Waupun, in the county of Fond du Lac, in the State of Wisconsin, have invented certain Improvements in Derricks, of which the following is a specification:

Nature and Object of the Invention.

Our invention is a derrick arranged so as to raise a whole load of hay at once and swing the same onto a stack or over the beam in a barn. It is made so as to lengthen the beam which raises the hay. Peculiar hooks hook into the chains at the end of the beam, so as to raise the load higher in case of need. The beam is jointed at the end where the tackle is attached, so that the end of the beam may be raised and hooked up with a hook. One part of the double block runs on a rope attached to stakes, so as to swing the load round as may be desired, and the fall passing through the other to haul by.

Description of the Drawing forming part of this Specification.

Figure 1 is a perspective view of our invention, and Fig. 2 a view of the hooks which are attached to the load to be raised.

General Description.

A is the main standard or part of the derrick; B, the main beam; C, a sliding beam on the beam B, to lengthen it; D D, the clasps which confine the two beams together, and set-screw which holds the clasps together; E, piece on the end of beams B, to be raised up or kept straight with the beam B, as may be desired; L, clasp to slip on over the joint and make piece E firm and straight with the beam B; G, a hook to hook onto piece E and hold it bent when thought best; H, rope to which the horses are attached to raise the hay; I, double blocks; K, chain attached to beam B; L, hooks attached to chains K, and into which are fastened ropes S; M, base of the derrick; N, hooks with which to draw derricks from place to place; O O, stakes to which rope P is attached; Q, a swivel-yoke with a pin entering a hole in the top of standard A and the beam B hung in it, so that it can swing round; R, poles to place under the hay with which to lift it; S, ropes attached to the ends of the poles and to hooks L.

This machine is easily understood. To use it, when hauling the hay onto the wagon, place the poles R on the bottom of the wagon and load the hay onto them; then drive to where the hay is to be unloaded; then hitch the ropes to the ends of the poles and to the hooks L of the derrick; then hitch the team to the rope H and draw, which raises the load of hay; then swing the hay by means of the runner-block I on the rope P, so as to bring the hay over the place where you wish to have the hay placed, and then slack up on rope H, and the hay will drop. If the derrick wants to be arranged to raise the hay higher, slip out piece C, which will lengthen the beam, hook up hooks L higher on the chains K, and bend up piece E on the end of the beam B, and hook up hook G, and the load will be raised higher. When the load is unloaded at the place desired, then pull out poles R and drive after another load.

Claims.

We claim as our invention—

1. The combination of standard A, beams B and C, clasp D, piece E, clasp F, chain K, hook L, poles R, and ropes S, substantially as described.

2. Double blocks I, rope P, and stakes O, in combination with rope H, substantially as described.

3. Hooks L, chain K, and rope S, all in combination, substantially as described.

4. Beam B, yoke Q, in combination with standard A, substantially as described.

FRANK DONALD.
GEORGE S. NEWTON.

Witnesses:
C. W. HENNING,
WM. HOBKIRK.